Figure 1:
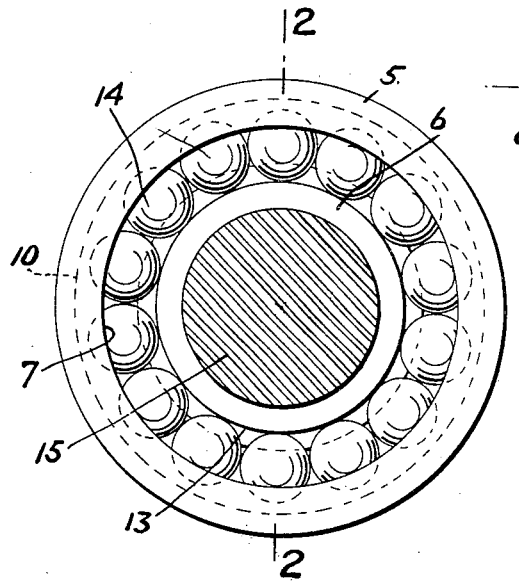

J. BOSNYAKOVITS.
BALL BEARING.
APPLICATION FILED DEC. 1, 1915.

1,235,102.

Patented July 31, 1917.

WITNESS:
Rob't R. Mitchel

INVENTOR
Joseph Bosnyakovits
BY
J. S. Preuner
ATTORNEY.

UNITED STATES PATENT OFFICE.

JOSEPH BOSNYAKOVITS, OF PHILADELPHIA, PENNSYLVANIA, ASSIGNOR OF ONE-SIXTH TO J. SHELDON KUNKLE, ONE-SIXTH TO EDWARD J. BAECHLE, AND ONE-SIXTH TO C. WILSON ROBERTS, ALL OF PHILADELPHIA, PENNSYLVANIA.

BALL-BEARING.

1,235,102.　　　　　Specification of Letters Patent.　　Patented July 31, 1917.

Application filed December 1, 1915. Serial No. 64,402.

*To all whom it may concern:*

Be it known that I, JOSEPH BOSNYAKOVITS, a citizen of the United States, and a resident of Philadelphia, in the county of Philadelphia and State of Pennsylvania, have invented certain new and useful Improvements in Ball-Bearings, of which the following is a specification.

My invention relates to improvements in antifriction bearings, and more particularly to bearings having a plurality of rows of balls, each row being confined to a pair of oppositely disposed grooves of a pair of concentric rings, the grooves constituting fixed and uninterrupted races for the balls, the bearing being adapted to overcome end thrusts, to resist any relative displacement of the outer and inner members of the bearing, and to prevent the displacement of the balls from their respective races.

In ball bearings of the above description, there are considerable difficulties in introducing the balls, as the rows of balls, when being introduced, interfere with each other.

The general object sought to be attained by my improvements is to facilitate the introduction of the balls so as to avoid the application of external forces which are apt to cause deformation or misshapement which ordinarily results in flat balls, the ball races being of sufficient depth to prevent the balls from leaving the races when the bearing is in use, the members of the bearing being in perfect radial alinement and in alinement with the axle or shaft irrespective of end thrusts or of the tilting of the shaft or axle.

I attain the aforesaid object by making the inner member of the bearing in two parts or sections, which parts, when the bearing is removed from the shaft or axle, are free to be so displaced and tilted as to produce enlarged open spaces between the members of the bearing through which the balls are freely introduced to fill the races compactly, and when the parts are alined and the bearing mounted on the shaft or axle the spaces are reduced to such an extent as to confine the balls to their respective races.

My improved ball bearing has the further advantage that it is of simple construction, is inexpensive, efficient and convenient for use and adapted to supply a long felt want.

With the above and related objects in view, my invention comprises the construction, combination and arrangement of parts hereinafter described, the embodiment whereof is illustrated in the accompanying drawing, and is embraced within the scope of the appended claims.

Figure 2:
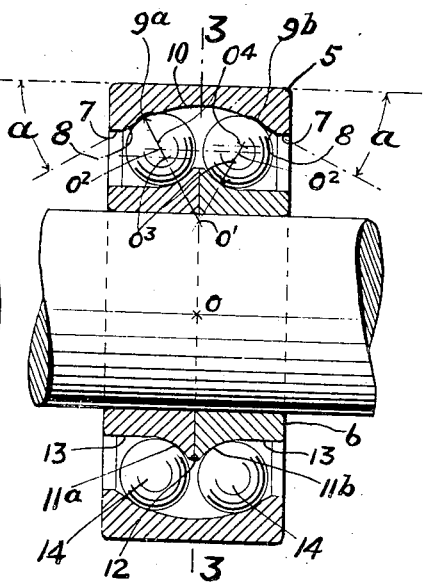
Figure 3:
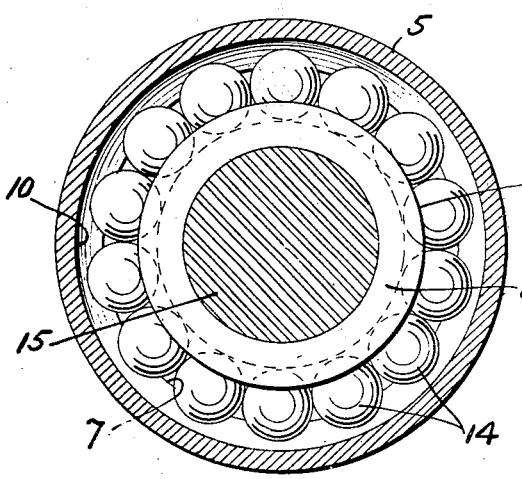
Figure 4:
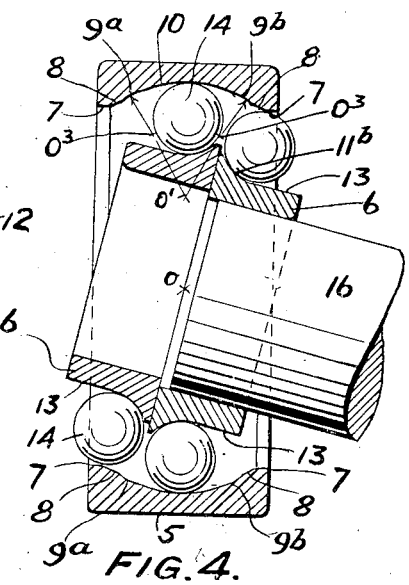

In the said drawing:—Figure 1 represents my improved ball bearing mounted on a shaft or axle; Fig. 2 represents a section on the line 2—2 of Fig. 1; Fig. 3 represents a section on the line 3—3 of Fig. 2, and Fig. 4 represents a sectional view similar to Fig. 2, the inner member being shown with its parts so displaced as to permit of the introduction or removal of the balls.

Referring more particularly to the drawing for a detail description of my invention, the reference numerals 5 and 6 represent respectively the outer and inner members of my improved bearing. The said outer member 5 is formed of an integral annular cylinder whose bore is provided with cylindrical rims 7, whence the bore is enlarged to form cones 8, the bore thence being grooved to form the ball races represented by 9, the adjacent rims of the races being joined by an enlarged groove represented by 10.

The inner member 6 is formed of two annular cylinders, each equal to half the axial width of the outer cylinder or member, said cylinders being provided with peripheral grooves which constitute the races $11^a$ and $11^b$ respectively equal and opposite to the races of the outer cylinder represented by $9^a$ and $9^b$. When the parts of the inner member are brought together face to face as shown in Fig. 2, the races of said member terminate at the peripheral flange 12, and are joined with the exposed faces of said member by the cylindrical surfaces 13 which are of equal diameter and less than that of the flange 12.

14 represents the balls which, as shown in Figs. 1 and 3, are arranged in two compact rows between the members of the bearing, and 15 represents the shaft carrying the bearing.

O represents a point of the axis of the bearing which is concentric with a plane midway of the opposite faces of the members of the bearing, $O^1$ a point on the circumference of a circle concentric with the center O, is the center of the arc of the groove 10 and the point of intersection of the bisectors of the arcs of the races which pass through the points of contact of the balls with the races and are on the opposite ends of the diameters of the balls. $O^2$ represents the center of each ball, $O^3$ represents the center of the arc of the races of the outer member, and $O^4$ the center of the arc of the races of the inner member. $a$ represents the inclination of each of the conical surfaces 8 relatively to that of the cylindrical surface of the outer member, said cylindrical surface being parallel with the rims 7.

From the foregoing it will be readily understood by those skilled in the art that, when a bearing of the above description is mounted on a shaft or axle 15, the relative movement of the members 5 and 6 will result in the balls, with which the races are shown to be compactly filled, rolling along the surfaces of their races without any possibility of ever getting away from the races. That neither axial thrusts, nor swaying or tilting will interfere with the concentricity, or the alinement of the members. That the effect of thrusts and tilts upon the bearing will be to prevent the formation of flat balls. That the members being concentric and in radial alinement and provided with comparatively deep and well defined races, which are uniform, permanent, continuous and uninterrupted, all danger of any of the balls getting jammed, displaced or deformed is thereby avoided.

It will also be understood that, when the bearing is removed from its shaft or axle the introduction or removal of the balls can be easily and freely effected, by means of a rod 16 as shown in Fig. 4, adapted to effect a relative displacement of the parts of the inner member. When the parts of the inner member are displaced as shown, the members of the bearing are thrown out of their radial and axial alinement, and when the members are not in alinement, the balls are free to either enter or leave the races.

The distinguishing characteristics of my improved bearing will thus be understood to be as follows: That the bearing consists of an inner and an outer member, each member being provided with well defined races, the races of one member being an exact counterpart of those of the other, the members being adapted to be normally in perfect and axial alinement, that when alined the balls are confined to the races with which they are in rolling contact at the opposite ends of their diameters, that the races are smooth, continuous, uninterrupted, that there are no means for the balls to enter or leave the races, that for the purpose of inserting or removing the balls the members are thrown out of alinement, that for the purpose of throwing the members out of alinement the inner member is made in two relatively displaceable parts normally adapted to be held in alinement by the shaft or axle of the bearing.

What I claim as new and desire to protect by Letters Patent, is—

1. A ball bearing comprising two concentric members provided with ball races, the races of one member being a counterpart of those of the other member, one of said members consisting of two parts which are in contact and adapted to be displaced without breaking contact.

2. A ball bearing comprising two concentric members provided with ball races, the races of one member being the counterparts of those of the other, the inner member having its races closer together than the outer member, said inner member consisting of two annular sections which abut against each other.

3. A ball bearing comprising a pair of concentric members provided with ball races, the races of one member being a counterpart of those of the other, said members adapted to be normally held in radial and axial alinement, one of the members consisting of two parts adapted to be displaced in such a manner as to throw it out of alinement with the other member.

4. A ball bearing comprising a pair of concentric members provided with ball races, the races of one member being the counterparts of those of the other, said members normally adapted to be held in radial and axial alinement, the inner member consisting of two relatively displaceable parts.

5. A ball bearing comprising a one piece outer member provided with a pair of ball races, a two piece inner member in radial and axial alinement with the outer member, each part of the inner member provided with a race adapted to coöperate with a diametrically opposite race of the outer member.

6. A ball bearing comprising a one piece annular outer member provided interiorly with a pair of ball races, an inner member normally held in alinement with the outer member and consisting of two annular contacting sections each provided with a race which is diametrically opposite and the counterpart of a race of the outer member, the races of the inner member being closer together than those of the outer member, and a row of balls between each pair of diametrically opposite races, each ball being in rolling contact with its races at the opposite ends of a diameter.

7. A ball bearing comprising a one piece outer member having a pair of oppositely inclined races of equal diameter and a groove of a diameter larger than that of the races, a two piece inner member provided with races diametrically opposite those of the outer member of which they are the exact counterparts, said inner member adapted to be normally held in radial alinement with the outer member, the adjacent faces of the parts of the inner member being in contact and adapted to be displaced along the contact surface without breaking contact.

8. A ball bearing comprising a one piece outer member and a two piece inner member, the pieces adapted to be held in alinement, with the adjacent faces of the parts of the inner member in contact and with the exterior faces in substantial alinement with those of the outer member, said members being provided with diametrically opposite races, each pair of races forming an unbroken and uniform bearing surface for a compact row of balls.

9. A ball bearing comprising two concentric members, and rows of balls between the members, said members being axially supported in radial alinement and provided with races in contact with the balls at the opposite ends of their diameters, each being an exact counterpart of the other and of a depth to prevent the balls from leaving them when the bearing is axially supported, one of the members consisting of two parts, adapted to be tilted in such a manner as to form spaces through which the balls may enter and leave the races.

10. A ball bearing comprising two concentric members and two compact rows of balls, the axes of the balls being oblique to the axis of the bearing, said members having coöperating races for the balls and rims to retain the balls, one of said members consisting of two tiltable parts, said parts being adapted to be concentrically supported to prevent the relative movement of the parts.

11. A ball bearing comprising two concentric members provided with ball races, one of said members consisting of two parts adapted to be moved in positions to permit of the introduction of balls into the races, said parts being adapted to be axially supported in radial alinement to cause the retention of the balls.

12. A ball bearing comprising a one piece outer member, a two piece inner member, and two rows of balls between said members, the parts of the inner member being adapted to be moved out of alinement with each other to permit of the introduction of the balls between the members, said bearing being adapted to be axially supported with the parts of the inner member in alinement to cause the retention of the balls between the members.

13. A ball bearing comprising an outer and an inner bearing members, the members being adapted to be axially supported in radial alinement and are provided with races, the races of one member being the counterparts of those of the other member, the inner member consisting of two parts adapted to be moved in such a manner as to create a space for the introduction of balls into the races, said parts, when axially supported being adapted to prevent the balls from leaving the races.

14. A ball bearing comprising two concentric members adapted to be axially supported in radial alinement with an annular space between them, the bore of one member provided with a pair of races and with a groove joining said races, the periphery of the other member being also provided with a pair of races which are the counterparts of the first above mentioned member and are joined by an elevation opposite the groove, said second member consisting of two parts adapted to be tilted so as to cause the parts to get out of alinement.

15. A ball bearing comprising an annular outer member provided interiorly with three circumferential grooves, the end grooves being of lesser diameter than that of the intermediate groove, an inner member provided with peripheral grooves diametrically opposite the end grooves of the outer member and with a peripheral flange intermediate said grooves, the grooves of the inner member being closer together than the end grooves of the outer member, two rows of balls between the end grooves of the inner and outer members, the inner member consisting of two annular parts abutting against each other and adapted to be supported in axial alinement with the outer member to prevent the balls from getting out of the grooves and to be tilted when the balls are being introduced or removed.

16. A ball bearing comprising an annular outer member provided interiorly with three circumferential grooves, the end grooves being of lesser diameter than that of the intermediate groove, an inner member provided with grooves respectively opposite the end grooves of the outer member and with a flange opposite the intermediate groove of said outer member, a row of balls between each pair of the opposite grooves of the outer and inner members, the balls contacting with grooves at points on lines passing through the centers of the balls and intersecting at the circumference of a circle concentric with the bearing and of lesser diameter than that of the inner member, said inner member consisting of two annular parts abutting against each other.

17. In a ball bearing, the combination of two inner members each provided with a peripheral groove, an outer member surrounding the inner members and provided interiorly with two grooves diametrically opposite the grooves of the inner members, the inner members being in axial alinement with and abutting against each other and coaxial with the outer member when in working condition, and two rows of balls between the opposite grooves of the outer and inner members and contacting with said grooves at points on inwardly converging lines passing through the centers of the balls and intersecting at the circumference of a circle concentric with the bearing, the distance between the outer portions of the outer and inner members being less than the diameter of the balls to prevent the escape of the balls from the grooves when the bearing is in said normal working condition, the inner members being adapted to be tilted with relation to the outer member and to be moved out of axial alinement with each other to increase the said distance to permit the insertion or removal of the balls.

18. In a ball bearing, the combination of two inner members each provided with a peripheral groove, an outer member surrounding the inner members and provided interiorly with two grooves opposite the grooves of the inner members, and a row of balls arranged between each pair of opposite grooves, the inner members being coaxial with the outer member and abutting against each other when the bearing is in working condition, the rims of the grooves preventing the escape of the balls from the bearing when in working condition, the inner members being adapted to be displaced to permit of the insertion or removal of the balls from the grooves, the outer member having a space intermediate its ball bearing grooves to permit of the displacement of the inner members during the insertion or removal of the balls.

19. In a ball bearing, the combination of two inner members each provided with a peripheral groove, an outer member provided with grooves surrounding the grooves of the inner members, and a row of balls arranged between each pair of the opposite grooves of the outer and inner members, the inner members being coaxial with the outer member and abutting against each other when in working condition, the distance between the opposite grooves of the outer and inner members being less than the diameter of the balls to prevent their escape when the bearing is in its working position, the inner members being adapted to be tilted to increase said distance to permit of the insertion or removal of the balls.

20. In a ball bearing, the combination of two annular members each provided with a peripheral groove, an outer member surrounding the inner members and provided interiorly with grooves opposite the grooves of the inner members, and a row of balls arranged between each pair of the opposite grooves, the distance between the rims of each pair of opposite grooves being less than the diameter of the balls, the inner members being coaxial with the outer member and abutting against each other when in working position, the inner members being adapted to be tilted to increase said distance, the outer member having an intermediate groove of larger diameter than that of its ball bearing grooves to permit of the tilting of the inner members, when the balls are to be introduced or removed from the bearing.

21. In a ball bearing, the combination of two inner members each provided with a peripheral groove, an outer member coaxial with the inner members provided interiorly with grooves surrounding the grooves of the inner members, and two rows of balls arranged between the grooves of the outer member and the grooves of the inner members and contacting with the said grooves on inwardly and downwardly converging lines passing through the centers of the balls and intersecting on the circumference of a circle concentric with that of the bearing, the inner members abutting against each other and adapted to be tilted when the bearing is being assembled or disassembled and to resist thrusts when in working position.

22. In a ball bearing, the combination of two inner members abutting against each other, an outer member surrounding the inner members, and two rows of balls between the inner and outer members, the inner members being in alinement with each other when the bearing is in its working position, the outer member being provided with a groove intermediate the rows of balls adapted to permit of the displacement of the balls when the bearing is being assembled and disassembled, the balls being inserted and removed from between the outer and inner members when the inner members are out of alinement.

23. A ball bearing comprising two inner members abutting against each other, each provided with a peripheral groove, an annular outer member surrounding the inner members provided with grooves opposite those of the inner members and with an intermediate groove, and a row of balls between each pair of opposite grooves of the outer and inner members, the bearing being adapted to retain the balls when it is in its working position, the inner members being in alinement with each other when the bearing is in its said position, the bearing being assembled and disassembled by tilting the inner members into and out of said alinement, the balls being forced into and out of their respective grooves by way of the intermediate groove of the outer member by the tilting of the inner members.

24. A ball bearing comprising two inner members abutting against and in alinement with each other, each provided peripherally with a ball bearing groove, an annular outer member surrounding the inner members provided with ball bearing grooves opposite those of the inner members and with a groove intermediate the ball bearing grooves, and a row of balls between each pair of opposite grooves, said ball bearing grooves being adapted to retain the balls in proper working relation when the bearing is in its working position, the inner members being adapted to be tilted out of said alinement to force the balls out of their respective grooves and to be tilted into said alinement to force the balls into their respective grooves, the balls being inserted and removed through the opposite ends of the bearing by way of the intermediate groove when the bearing is being assembled or disassembled.

25. A ball bearing comprising two inner members abutting against each other, each provided with a ball bearing groove, an outer member surrounding the inner members and provided internally with ball bearing grooves opposite those of the inner members, and a row of balls between each pair of opposite grooves, said inner members adapted to be axially supported in alinement with each other when the bearing is in its working position, said ball bearing grooves being adapted to retain the balls when the inner members are in alinement, said inner members being adapted to be tilted out of alinement when not axially supported, the balls being forced out of the ball bearing grooves when the inner members are being tilted out of alinement and are forced into said grooves when the inner members are tilted into alinement, the outer member being provided with a groove intermediate the ball bearing grooves adapted to be passed by the balls when forced into or out of their respective ball bearing grooves.

26. A ball bearing comprising two inner members abutting against each other, each provided with a peripheral ball bearing groove, an annular outer member surrounding the inner members and provided interiorly with ball bearing grooves opposite those of the inner members and with a groove intermediate said ball bearing grooves, said inner members adapted to be axially supported in alinement with each other when the bearing is in its working position and to be tilted out of alinement when not axially supported, two rows of balls between the outer and inner members, said balls being inserted from the opposite sides of the bearing by way of the intermediate groove when the inner members are out of alinement, said balls being forced into their respective grooves when the inner members are forced into alinement with each other and are forced out of their grooves when the inner members are forced out of said alinement, the ball bearing grooves being adapted to retain the balls when the bearing is in its working position.

In testimony whereof I have signed this specification in the presence of two subscribing witnesses.

JOSEPH BOSNYAKOVITS.

Witnesses:
Z. WILSON ROBERTS,
IRENE HANSON.